(12) United States Patent
Knies et al.

(10) Patent No.: US 8,226,919 B2
(45) Date of Patent: Jul. 24, 2012

(54) METHOD FOR REMOVING TITANIUM FROM HEXACHLORODISILANE

(75) Inventors: Wolfgang Knies, Burghausen (DE); Hans Eiblmeier, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/119,349

(22) PCT Filed: Oct. 8, 2009

(86) PCT No.: PCT/EP2009/063087
§ 371 (c)(1),
(2), (4) Date: Mar. 16, 2011

(87) PCT Pub. No.: WO2010/043536
PCT Pub. Date: Apr. 22, 2010

(65) Prior Publication Data
US 2011/0182794 A1    Jul. 28, 2011

(30) Foreign Application Priority Data
Oct. 17, 2008 (DE) .......................... 10 2008 042 936

(51) Int. Cl.
*C01B 33/08* (2006.01)

(52) U.S. Cl. ............. 423/342; 423/341; 423/69; 203/41
(58) Field of Classification Search ................. 423/342, 423/341, 69; 203/41
See application file for complete search history.

(56) References Cited

U.S. PATENT DOCUMENTS

| 3,216,784 A | 11/1965 | Pechiney |
| 3,878,291 A | 4/1975 | Keller et al. |

FOREIGN PATENT DOCUMENTS

| EP | 1 867 604 | 12/2007 |
| GB | 1 241 108 | 7/1971 |

OTHER PUBLICATIONS

International Search Report for PCT/EP2009/063087 dated Dec. 1, 2010.

*Primary Examiner* — Melvin C Mayes
*Assistant Examiner* — Melissa Stalder
(74) *Attorney, Agent, or Firm* — Caesar, Rivise, Bernstein, Cohen & Pokotilow, Ltd.

(57) ABSTRACT

The invention relates to a method for removing titanium compounds from hexachlorodisilane, wherein hexachlorodisilane is treated with an organic compound (V) which contains the structural units =C—S— or =C—O—.

3 Claims, No Drawings

METHOD FOR REMOVING TITANIUM FROM HEXACHLORODISILANE

BACKGROUND OF THE INVENTION

The invention relates to a method for removing titanium from hexachlorodisilane through treatment with organic compounds.

Hexachlorodisilane which is produced from silicides always contains traces of titanium and other metallic impurities. Titanium is critical inasmuch as titanium(IV) chloride differs only slightly from hexachlorodisilane in terms of boiling point. In order to separate it off, complex fractional distillation is required.

One option is to workup the silane mixture produced during the separation of silicon since the chlorosilanes used for this can be relatively easily freed from titanium by distillation. During the separation of silicon, disilanes are in turn formed from the chlorosilanes, but in concentrations below 1% by weight. Upon storing these silanes in stainless steel containers, corrosion can lead to titanium again arising in the product, which has hitherto again only been able to be separated off by fractional distillation.

U.S. Pat. No. 3,878,291 (Apr. 15, 1975, Kleber et al.) describes a complex method for obtaining tetrachlorosilane free from titanium and other metals.

SUMMARY OF THE INVENTION

The invention provides a method for removing titanium compounds from hexachlorodisilane, in which hexachlorodisilane is treated with organic compound (V) which contains structural units =C—S— or =C—O—.

DETAILED DESCRIPTION OF PREFERRED EMBODIMENTS

The titanium impurities, in particular titanium(IV) chloride, are bonded by the organic compounds (V) which contain structural units =C—S— or =C—O—, and can be separated off easily as a result.

The method according to the invention has the further advantage that hexachlorodisilane is obtained in high purity. Purities of at most 100, in particular at most 50 ppb of Ti (based on the weight) can be achieved.

Following treatment with the compounds (V), the bonded titanium compounds can be separated off from the hexachlorodisilane in different ways. The bonded titanium compounds are preferably separated off from the hexachlorodisilane by distillation, decantation or filtration.

The distillation is considerably simplified compared with the untreated hexachlorodisilane since, due to the altered boiling point of the bonded titanium compounds, it is possible to dispense with the complex fractional distillation. Preferably, the bonded titanium compounds remain in the bottom of the distillation.

When removing titanium compounds from hexachlorodisilane, it is also possible to use a solvent.

The structural units =C—S— or =C—O— are preferably selected from the structural units =C—S—H, =C—S—C= and =C—O—C=. Di-(=C—SS—C=) and trisulfides)(=C—SSS—C=) are also suitable.

Preferred compounds (V) are cyclic ether compounds which preferably have at least 5 ring atoms and preferably at most 30 ring atoms, such as 1,3-dioxolane, tetrahydrofuran, tetrahydropyran, 1,4-dioxane, [12]crown-4, [15]crown-5. The cyclic ether compounds can have hydrocarbon substituents, in particular alkyl radicals having 1 to 6 carbon atoms, preferably methyl and ethyl. Examples of substituted cyclic ether compounds are 4-methyl-1,3-dioxolane, 3-methyltetrahydrofuran, 2,2-dimethyl-1,4-dioxane.

Likewise preferred compounds (V) are linear or branched ether compounds (=C—O—C=), such as mono- and polyethers. Preferred monoethers are ethers with a boiling point of at least 60° C. at 1 bar, for example di-n-propyl ether. Polyethers which can be used are also polyalkylene glycols, such as polyethylene glycol and polypropylene glycol. The average molar masses Mn of the polyalkylene glycols are preferably at least 150, in particular at least 500 and preferably at most 10 000, in particular at most 5000.

Preferred compounds (V) are also cyclic and linear thioether compounds, such as dialkyl sulfides. Among the thiols (=C—S—H), compounds with a molecular weight of at least 1000 are preferred. Examples thereof are vinyl polymers with SH groups, such as ion exchangers, e.g. Amberlite® G 73.

Per 100 parts by weight of hexachlorodisilane, preferably at least 0.001, particularly preferably at least 0.05 parts by weight of compound (V), and preferably at most 10, particularly preferably at most 5 parts by weight of compound (V) are used.

Mixtures which contain hexachlorodisilane can also be treated with organic compound (V).

Preferably, the hexachlorodisilane used comprises at most 100 ppm, particularly preferably 10 ppm, in particular 1 ppm, of titanium, in each case based on the weight.

For example, it is possible to use chlorosilane mixtures containing hexachlorodisilane which are obtained from the reaction of HCl with calcium silicide, from the reaction of chlorine with silicon or from the process off-gases from the separation of polycrystalline silicon, particularly preferably process off-gases which are obtained during the separation of polycrystalline silicon. These chlorosilane mixtures used may have been treated before or during the purification with chlorine in order to convert hydrogenchlorosilanes to chlorosilanes since especially hydrogenchlorosilanes with a relatively high hydrogen content can be self-igniting.

The chlorosilane mixtures used can also be admixed with further substances, such as e.g. activated carbon or—if at all—silica produced preferably by pyrolytic means or by precipitation process.

The treatment with organic compound (V) preferably takes place at at least −5° C., preferably at least 15° C.

If the bonded titanium compounds are separated off by distillation, the distillation can take place either under atmospheric pressure, superatmospheric pressure or reduced pressure.

The distillation according to the invention can be carried out in the presence or absence of protective gas, such as nitrogen, helium or argon; however, it can also be carried out in air provided the moisture content is at most 10 ppbw. Preferably, for reasons of cost, the distillation is carried out in the presence of nitrogen.

Unless stated otherwise, the examples below are carried out at a pressure of the surrounding atmosphere, thus about at 1000 hPa, and at room temperature, thus at about 23°.

In the examples below, the content of impurities was determined following hydrolysis by means of ICP-MS (ion coupled plasma mass spectrometry).

EXAMPLE 1

3 drops of 1,4-dioxane were added to 130 g of hexachlorodisilane with a content of 120 ppb of titanium. The hexachlorodisilane was boiled at reflux and then distilled off over a bridge.

| Result | | |
|---|---|---|
| | Crude hexachlorodisilane | After treatment with dioxane |
| Ti [ppb] | 80 | 21 |

EXAMPLE 2

In a further analogous experiment, 3 drops of 3-methyltetrahydropyran were likewise added to 130 g of hexachlorodisilane, boiled at reflux and then distilled off over a bridge.

| Result | | |
|---|---|---|
| | Crude hexachlorodisilane | After treatment with 3-methyltetrahydropyran |
| Ti [ppb] | 190 | 33 |

EXAMPLE 3

4 g of Amberlite® GT 73 were added to ca. 100 g of hexachlorodisilane and stirred for 6 hours at room temperature. A sample was filtered off and analyzed.

| Result | | |
|---|---|---|
| | Crude hexachlorodisilane | After treatment with Amberlite after 6 hours |
| Ti [ppb] | 190 | 7 |

The invention claimed is:

1. A method for removing a titanium compound from hexachlorodisilane, said method comprising treating hexachlorodisilane with an organic compound (V) which is a vinyl polymer with SH groups to remove the titanium compound therefrom.

2. The method as claimed in claim 1, wherein the titanium compound is bonded with the organic compound (V) and the bonded titanium compound is separated off from the hexachlorodisilane by distillation, decantation or filtration.

3. The method as claimed in claim 1, wherein titanium (IV) chloride is removed.

* * * * *